United States Patent [19]

Grange

[11] Patent Number: 5,297,499
[45] Date of Patent: Mar. 29, 1994

[54] CLEAT FOR SECURING A BOAT TO A DOCKING STRUCTURE

[76] Inventor: Robert T. Grange, 333 Victory Rd., North Quincy, Mass. 02171

[21] Appl. No.: 12,586

[22] Filed: Feb. 3, 1993

[51] Int. Cl.$^5$ ............................................. B63B 21/00
[52] U.S. Cl. ..................................... 114/218; 114/230
[58] Field of Search ............... 114/218, 230; 24/128, 24/115 R

[56] References Cited

U.S. PATENT DOCUMENTS

| | | | |
|---|---|---|---|
| 3,110,046 | 11/1962 | Fischer | 114/218 |
| 3,293,711 | 8/1965 | Emery, Jr. | 114/218 |
| 3,473,505 | 10/1966 | Brown | 24/116 |
| 3,715,782 | 2/1973 | Newell | 114/218 |
| 3,812,811 | 5/1974 | Rodriguez | 114/218 |
| 3,838,659 | 10/1974 | Coleman, II | 114/199 |
| 4,082,054 | 4/1978 | Bruner | 114/218 |
| 4,095,548 | 6/1978 | Bruner | 114/230 |
| 4,190,011 | 2/1980 | Guthmann | 114/218 |
| 4,458,631 | 7/1984 | Hystad | 114/218 |
| 4,603,649 | 8/1986 | Hystad | 114/199 |
| 4,683,831 | 8/1987 | Shaffner | 114/218 |
| 4,706,594 | 11/1987 | Burns | 114/230 |

*Primary Examiner*—Edwin L. Swinehart
*Attorney, Agent, or Firm*—Anthony J. Casella; Gerald E. Hespos

[57] ABSTRACT

Cleats are provided for securing a boat to a dock or to piling. The cleat includes a cleat plate having at least one slot with a chamfered entry into which a line may be tossed. Cleats intended for mounting on a dock preferably have a plurality of slots aligned to face away from the boat being docked. The cleat may be secured to the dock by a mounting block configured to achieve a cleat angle appropriate for the height of the dock and the size of the boat. The cleat also may be secured to a conventional dock cleat to avoid drilling new holes in the dock. Alternatively, the cleat may be mounted to piling, and may include a diagonally aligned dowel to create a large tapered entry into a small retention notch. The cleat may be used with a line having a knot in the working end sufficiently large to be engaged by the cleat.

17 Claims, 6 Drawing Sheets

CLEAT FOR SECURING A BOAT TO A DOCKING STRUCTURE

BACKGROUND OF THE INVENTION

1. Field of the Invention

The subject invention relates to a cleat which can be mounted to a structure, such as a dock or piling and which enables an individual on a boat to secure the boat to the cleat and to release the boat from the cleat without the assistance of a person positioned near the cleat.

2. Description of the Prior Art

Recreational boating has grown dramatically in recent years, and many purchasers of boats have only limited sailing and boating experience. Some of the more difficult tasks for even experienced boater include: bringing a boat into a dock, securing the boat and then subsequently casting off.

A boat typically is secured to a dock by a bow line, a stern line and a pair of spring lines which are secured to prior art dock cleats. The bow line and the stern line preferably are secured to cleats near the bow and the stern respectively to hold the boat near the dock, while the spring lines extend diagonally to prevent movement parallel to the dock.

The prior art dock cleat is of generally T-shape with a vertical base extending from the dock and with a pair of horizontal arms in generally spaced parallel relationship to the surface of the dock. Initial attachment of a line to the prior art dock cleat may involve looping the line around the vertical member of the prior art cleat. If a loop is not permanently part of the line, then the boater must alternately loop the line under one cleat arm and over the next.

A boater typically will approach a dock at an angle. As the dock is neared, the boater will slow down and turn. Momentum will cause the stern to drift toward the dock as the entire boat drifts along the dock.

The boater typically will enlist an assistant on shore to catch an end of a spring line tossed toward the dock, and to at least temporarily secure the spring line to the prior art dock cleat. The spring line is intended to stop the forward or rearward movement of the boat depending on the direction of approach to the dock. The on-shore assistant may then move quickly to either a midship cleat or a bow cleat, depending upon the preference of the boater, for receiving another line tossed from a person on the boat. The assistant standing on the dock and the boater will cooperate to secure the other spring line, the stern line and the bow line to prior art dock cleats in a sequence preferred by the boater. At this point, the boat still may not be secured safely to the dock. Consequently, the boater may disconnect the loosely mounted lines and more securely tie the vessel to the dock. A similar procedure will be carried out in reverse when the boater is ready to cast off from the dock. Casting off generally requires an on-shore assistant to disconnect the lines from the prior art dock cleats, and to toss the lines to someone on the boat.

Boaters often are required to dock and cast off without assistance from a person on shore. To dock without an on-shore assistant, the boater will approach the dock and then turn so that the boat drifts laterally or diagonally toward the dock. A member of the crew will try to position himself near the point of impending impact, and then jump off to loop the appropriate spring line around a prior art cleat. For example, the crew member may be positioned near midship and may loop the stern spring line around the stern cleat to arrest the forward motion. The crew member may then sequentially secure the stern line, the bow line and the bow spring line to nearby prior art dock cleats. It may be necessary to retie certain lines for a more secure attachment to the dock. Additionally, larger boats may have winches on board to pull in line. Thus, the crew member may jump from the boat to the dock to loop the cleat and then from the dock to the boat to wind the winch and secure the boat. A similar procedure may be carried out by the unassisted boater to cast off from the dock. In particular, the boater will stand on the dock and release the bow line. The boater will then release the stern line and jump from the dock into the freed boat.

Most boaters know of instances where the boater, a crew member or an on-shore assistant fell into the water while attempting to dock or cast off. In more serious situations, however, injury to the boater or the on-shore assistant and/or damage to the boat or the dock can occur.

Ownership of a dock is a luxury most boaters cannot afford. A more typical situation involves a boater renting or otherwise using dock space of another. As a result, retrofitting a dock with means to facilitate docking (e.g. cleats or extensive bumpers) may not be possible. Many dock owners will not permit renters or users to permanently attach any structure to the dock or to drill holes.

Pilings are vertical posts to which a boat may be docked. Docking to a piling also can be difficult. In particular, an on-shore assistant may not be able to conveniently access a piling cleat. Additionally, a piling generally will represent a smaller target for the amateur boater to aim at.

The prior art includes many examples of cleats intended to facilitate the secure tying of a line from a boat and/or to facilitate docking. Examples of prior art cleats that are intended to facilitate the securing of a line are shown, for example, in U.S. Pat. No. 3,715,782 to Newell; U.S. Pat. No. 3,812,811 to Rodriguez; U.S. Pat. No. 3,838,659 to Coleman, II; U.S. Pat. No. 4,458,631 to Hystad; U.S. Pat. No. 4,553,495 to Lerner; U.S. Pat. No. 4,603,649 to Hystad; and U.S. Pat. No. 4,683,831 to Shaffner. Many of these patents are primarily intended for cleats disposed on the boat, and enable a line from a sail or the like to be forced into a groove or slot between two members (e.g. U.S. Pat. No. 4,553,495). Others include hinged components which will lock in at least one direction (e.g. U.S. Pat. No. 4,603,649).

U.S. Pat. No. 3,293,711 issued to Emery, Jr. on Dec. 27, 1966 and shows a dock cleat in the form of an open shell. One side of the shell is open to provide access to the interior of the shell. The shell further includes a slot extending from the open side to an opposed side thereof. The cleat of U.S. Pat. No. 3,293,711 is intended for use with a ball affixed to an end of a rope. The ball is dimensioned to be fit through the open side of the shell and to be engaged within the shell. The rope extending from the ball is dimensioned to be passed through the slot in the shell. The cleat of U.S. Pat. No. 3,293,711 is used by carefully aligning the ball with the opening in the shell and simultaneously aligning the rope with the slot. The ball can be urged into the shell and the rope can be urged through the slot. The cleat shown in U.S. Pat. No. 3,293,711 avoids the need for a complicated knotting of a rope to a cleat. However, it would be virtually impossible to engage the cleat of U.S. Pat. No. 3,293,711 from a remote location.

U.S. Pat. No. 3,110,046 issued to Fischer on Nov. 12, 1963 and shows a generally hollow moring buoy with a concave top surface having a central opening and a plurality of radially extending slits. A ball is attached to an end of a rope and is dropped into the concave top surface. The ball is intended to gravitationally roll toward the central hole in the concave upper surface. The ball is dimensioned to fall through the hole, and the rope is dimensioned to be engaged in one of the slots. Although a ball without a rope would roll easily toward the opening in the concave top surface of the moring buoy shown in U.S. Pat. No. 3,110,046, a ball with a rope is not as apt to roll. Furthermore, balls tend to bounce when tossed. Hence even a properly aimed ball may not remain on the buoy. Additionally, disengagement of the ball and rope from the moring buoy shown in U.S. Pat. No. 3, 110,046 can be very difficult.

Another moring device is shown in U.S. Pat. No. 3,473,505 which issued to Brown on October 21, 1969. U.S. Pat. No. 3,473,505 shows several embodiments of buoys and dock cleats which are intended to enable a boat to be docked without an on-shore assistant. Each embodiment in U.S. Pat. No. 3,473,505 includes a plurality of spaced apart ears defining rope-receiving slots therebetween. The ears extend upwardly from a horizontal support surface and then curve approximately 90°–180° about substantially horizontal axes. The cleats shown in U.S. Pat. No. 3,473,505 are used with a ball attached to an end of a rope as described in the preceding two patents. The ball is intended to be thrown from a boat toward the dock such that the ball lands on the shore-side of the cleat and such that the rope falls into a space between the ears. U.S. Pat. No. 3,473,505 also shows a lock bar with a catch at opposed ends for locking into apertures on the dock cleat for preventing unintended removal of the rope therefrom. The ears of the cleats shown in U.S. Pat. No. 3,473,505 are not configured in a manner that would facilitate engagement of the rope therebetween from a remote location. Additionally, the shape of the ears makes it difficult or impossible to disengage the ball and the line from a remote location for casting off from the dock.

The prior art generally does not aid the many boaters who rent or temporarily use dock space at marinas which prohibit any permanent attachment to the dock. Additionally, the prior art does not recognize the fact that boats come in different sizes. A large boat riding high in the water might not necessarily require a cleat construction identical to that of a lower riding boat. Additionally, the prior art does not recognize the fact that cleats often are tossed to the dock from different angles depending upon the position on the boat from which the line is being tossed. The prior art also has not recognized unique problems associated with docking at a piling.

In view of the above, it is an object of the subject invention to provide a dock cleat to facilitate docking and casting off by an individual without an on-shore assistant.

Another object of the subject invention is to provide a dock cleat that can be removably mounted to a dock without drilling holes or other structural changes that would be prohibited by a dock owner.

It is another object of the subject invention to provide a dock cleat that can be adjustably mounted to a dock in accordance with the size of the boat being docked.

It is a further object of the subject invention to provide an assembly of dock cleats to facilitate securing a boat to a dock at a plurality of spaced apart locations.

Yet another object of the subject invention is to provide a cleat to enable secure retention of a boat line thereto without complicated knotting.

SUMMARY OF THE INVENTION

The subject invention is directed to a cleat which enables a person on a boat to secure a line to a dock or pile without the assistance of a person on the dock or at the pile. The cleat includes a cleat plate having at least one tooth defining at least one notch or slot for receiving a line. Embodiments of the cleat intended for a piling may include a cleat plate with single tooth, and with a line-receiving notch being defined between the tooth and the piling. Embodiments of the cleat for mounting to a horizontal or vertical dock surface may comprise a cleat plate with a plurality of teeth with a line-receiving slot being defined between each pair of adjacent teeth.

The teeth of the cleat are configured to define a chamfered opening into which a line will be gravitationally guided. The chamfered opening to each slot preferably defines an angle of between approximately 60° and approximately 120°. For example, each tooth may include a flared entry surface aligned at approximately 45° to the central axis of the associated slot. The teeth also are configured to define a line retention region of the slot or notch. The line retention region of the slot may be defined by opposed parallel edges of the teeth spaced sufficiently apart for receiving a line therebetween. However, in certain embodiments the teeth may be configured to define a slot that is wider at its base than at its opened end. This latter embodiment, however, is more costly to manufacture, does not aid significantly in rope retention and can unnecessarily complicate removal of the rope from the cleat.

Each tooth may be substantially planar, and a plurality of the teeth may be disposed in coplanar relationship to one another. More particularly, the teeth and the slots therebetween may be cut, machined or otherwise formed from a unitary planar cleat plate of substantially rigid material, such as plastic.

The cleat plate of the dock cleat may define an acute angle to the horizontal top surface of the dock. The particular angular alignment may vary with the size of the boat and how high the boat rides in the water. Boats that ride low in the water may have the cleat plate aligned at angles closer to vertical. Boats that ride higher in the water may have their cleat plate aligned at angles closer to horizontal.

The horizontal-to-vertical angular orientation of the cleat plate may be achieved by non-rectangular polygonal mounting blocks for securing the cleat plate to the dock in spaced relationship. For example, the mounting blocks may be substantially trapezoidal in shape. The blocks may be oriented on the dock to achieve a selected angular orientation of the cleat plate for the particular boat being docked.

Vertical planes passing through the teeth or the slots of the dock cleat may also be aligned at an acute angle to a vertical docking surface of the dock. The angle and the orientation of these vertical planes through the teeth or slots may be selected in accordance with the longitudinal position of the cleat relative the boat. Thus, the dock may be provided with a stern cleat for securing the stern line and the stern spring line. The teeth and slots on the stern cleat may be angularly aligned to open aft of the stern. The dock may also have a bow cleat for securing the bow line and the bow spring line. The teeth and slots on the bow cleat may be angularly aligned to open forward of the bow. A midship cleat may be provided for the stern spring line and/or the bow spring line, and may have teeth angularly aligned in both directions. The angular orientation on the teeth and slots on the stern cleat prevents the stern line and the stern spring line from disengaging from the slot. The angular orientation of the teeth on the bow cleat prevents the bow line from disengaging from the slot during and after docking.

The mounting block for securing the cleat plate of the dock cleat to the dock may include apertures for directly bolting both the cleat plate and the mounting block to the dock. However, as noted above, many marinas prohibit the drilling of holes into the dock. For these situations, the mounting block may include clamping means for securing the mounting block to an existing dock cleat. The clamping means may comprise a U-bolt or a pair of angle bolts for secure attachment beneath the arms of the T-shaped prior art dock cleat.

The line used with the dock cleat of the subject invention may merely include a knot tied in the working end. The knot is dimensioned to define a cross-section greater than the cross-section of the slot in the cleat. The knot provides advantages over the prior art ball in that the knot is less likely to bounce after hitting the surface of the dock. The invention may further include an elongate generally S-shaped line frame about which the line may be tied. After secure tying about the frame, the combined line and frame may be dipped in a thermoplastic material to prevent unraveling and untying.

The cleat of the subject invention may further include means for securely retaining the line in the slot. The retention means may include an elastic cord securely affixed to both longitudinal end of the cleat plate. The elastic cord may then be stretched across at least selected teeth and slots for retaining a line from the boat. Additionally, the elastic cord securely retains the boat line in its slot or notch.

DETAILED DESCRIPTION OF THE PREFERRED EMBODIMENTS

Figure 1:
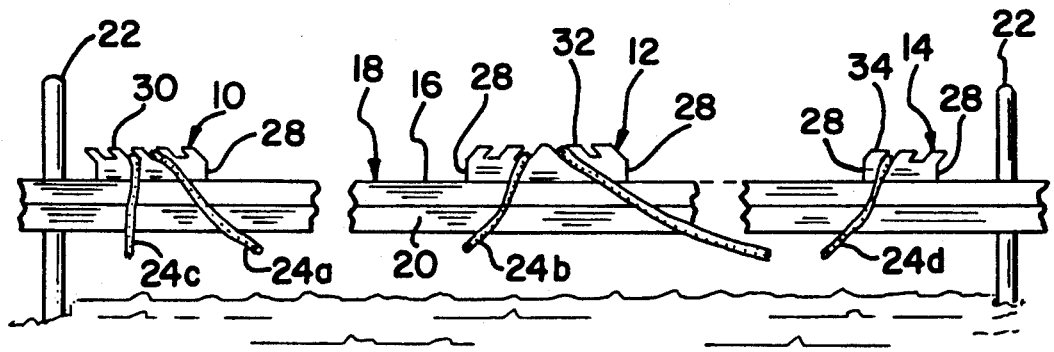
FIG. 1 is a front elevational view of a dock having a plurality of dock cleats in accordance with the subject invention.
Figure 2:
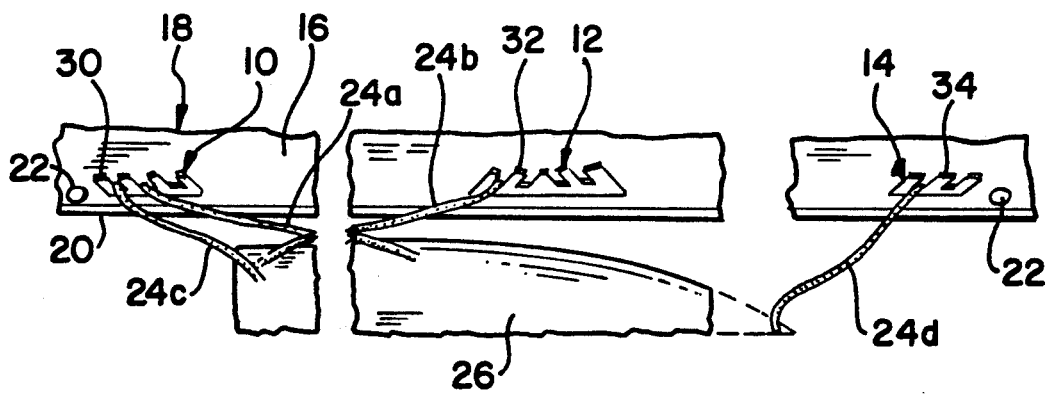
FIG. 2 is a top plan view of a boat and the dock shown in FIG. 1.

Dock cleats in accordance with the subject invention are identified generally by the numerals 10, 12 and 14 in FIGS. 1 and 2. The dock cleats 10–14 are securely mounted to the horizontal top surface 16 of a dock 18 in proximity to a vertical edge 20 of the dock. The dock 18 is supported on piles 22 which may also have cleats, as explained further below. Alternatively, the dock may be mounted on floats (not shown). The dock cleats 10–14 define a stern cleat 10, a midship cleat 12 and a bow cleat 14. All three dock cleats 10–14 can receive and releasably retain lines 24a–d thrown from a boat 26 as illustrated most clearly in FIG. 2. The dock cleats 12–14 each include a plurality of mounting blocks 28 which are secured to the horizontal top surface 16 of the dock 18 as explained further herein. Additionally, the dock cleats 10, 12 and 14 include cleat plates 30, 32 and 34 respectively.

Figure 3:
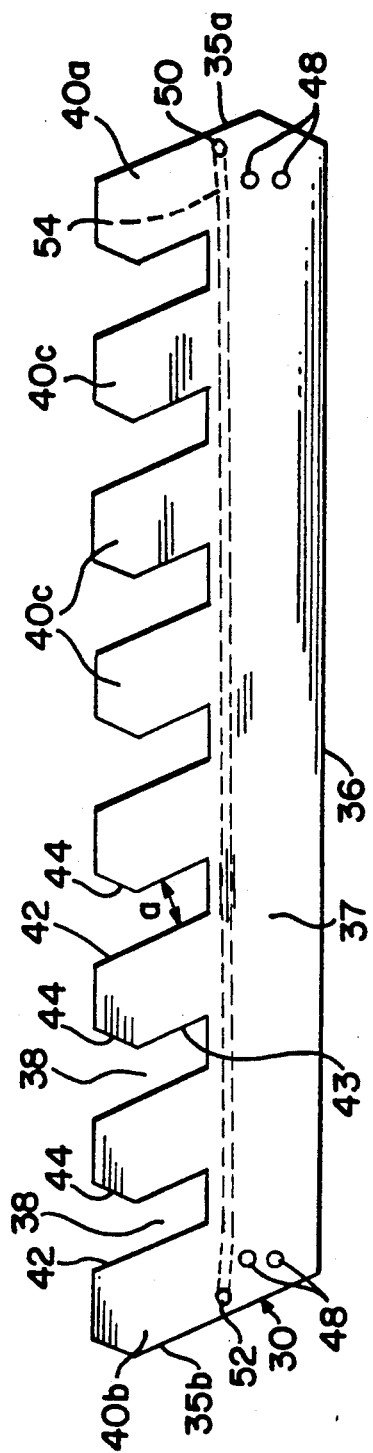
FIG. 3 is a top plan view of a cleat plate for a stern cleat as shown in FIGS. 1 and 2.

The cleat plate 30 of the stern cleat 10 is illustrated in greater detail in FIG. 3. More particularly, the stern cleat plate 30 is an elongate substantially planar plate unitarily formed from a rigid thermoplastic material. The plate is machined or molded to include opposed first and second ends 35a and 35b and a continuous longitudinal side edge 36 extending between the ends 35a and b. Portions of the cleat plate 30 adjacent side edge 36 define a continuous support 37 extending the length of the cleat plate 30. The opposed longitudinal side defines an engagement edge characterized by a plurality of substantially parallel slots 38 extending therein and defining a first end tooth 40a, a second end tooth 40b and a plurality of intermediate teeth 40c. Each tooth 40a–c includes a substantially linear guide edge 42 aligned at an acute angle to the longitudinal axis of the plate 30. Each tooth 40a–c further includes a slot edge 43 defining the opposed side of the respective slot 38. The slot edges 43 are substantially parallel to the guide edges 42, such that base portions of each slot 38 in proximity to the continuous support 36 are defined by the guide edge 42 of one tooth 40b–c and the parallel slot edge 43 of a tooth 40a or c adjacent thereto. The slots 38 define a width "a" sufficient to enable gravitational sliding of the line 22 into any of the slots 40a–c. Each tooth 40a–c further includes a chamfered edge 44 defining an acute angle to the longitudinal axis of the cleat plate 30. However, the chamfered edge 44 is aligned in a direction opposite to the alignment of the guide edge 42. Thus, each slot 38 includes an entry which defines an angle preferably in the range of 60°–90°.

The stern cleat plate 30 includes a first plurality of mounting apertures 48 extending therethrough. The mounting apertures 48 are dimensioned to receive mounting bolts for securely connecting the stern cleat plate 30 to the mounting blocks 28 as explained further herein.

The stern cleat plate 30 further includes a first elastic retention cord mounting aperture 50 extending through the first end tooth 40a and a second elastic retention cord mounting aperture 52 extending through the second end tooth 40b. An elastic retention cord 54 has its ends secured respectively in the aperture 50 and is dimensioned to be stretched over the teeth to engage one or more lines engaged in the slots for preventing accidental separation of a line as a docked boat bobs in the water.

Figure 4:
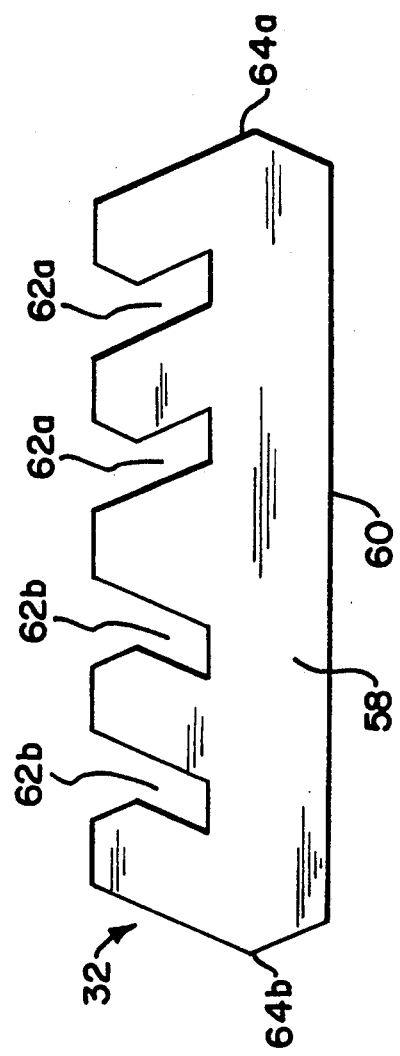
FIG. 4 is a top plan view of a cleat plate for a midship cleat as shown in FIG. 1.

As shown in FIGS. 1 and 2, the stern cleat 10 is oriented on the dock 18 such that the slots 38 thereof are angled to face in a direction aft of the stern of the boat 26. This alignment reflects the fact that the boat typically will be drifting in a forward direction when the stern spring line 24a is tossed toward the stern cleat 10. This momentum will help to securely lock the stern spring line 24a into one of the slots 38 of the stern cleat The midship cleat plate 32 is illustrated more clearly in FIG. 4. The midship cleat plate 32 includes an elongate support 58 having a longitudinal edge 60. The opposed side of the midship cleat plate 32 includes a plurality of slots 62a and b cut, machined or otherwise formed therein. The slots 62a are parallel to one another and are angled toward the center of the plate 32. The slots 62a extend from a first end 64 of midship cleat plate 32 to a location intermediate the length of the midship cleat plate. The slots 62b extend from the second end 64b of the midship cleat plate 32 to a central region of the midship cleat plate. Slots 62b are parallel to one another and are angled toward the central region of the midship cleat plate 32. The different angular alignments of the slots 62a and 62b reflects the fact that stern or bow spring lines may be tossed from the boat to the midship cleat 12 from either of two opposed directions. Thus a spring line could extend from the bow of the boat to slots 62a and a second spring line could extend from the stern of the boat to slots 62b. The configuration of each slot 62a and 62b in the midship cleat plate 32 is substantially the same as the configuration of the slots 38 in the stern cleat plate 30. More particularly, each slot 62a, b of the midship cleat plate 32 includes a chamfered opening configured to readily permit gravitational guiding of a line tossed therein, and a base portion dimensioned to retain the line.

The bow cleat plate 34 is similar to the stern cleat plate 30, with two exceptions. First, the stern cleat plate 34 is oriented such that the slots therein are directed forwardly from the bow of the boat, or in an opposite direction from the slots and the stern cleat plate 30. Second, the bow cleat plate is substantially shorter than the stern cleat plate as illustrated in FIGS. 1 and 2. This difference in length reflects the fact that the bow cleat is an easier target to hit with a line because movement of the boat will have been substantially stopped by the engagement of the stern line in the stern cleat 10, and because the bow is likely to be fairly close to the dock at the stage of docking when the bow line is being secured.

Figure 5:
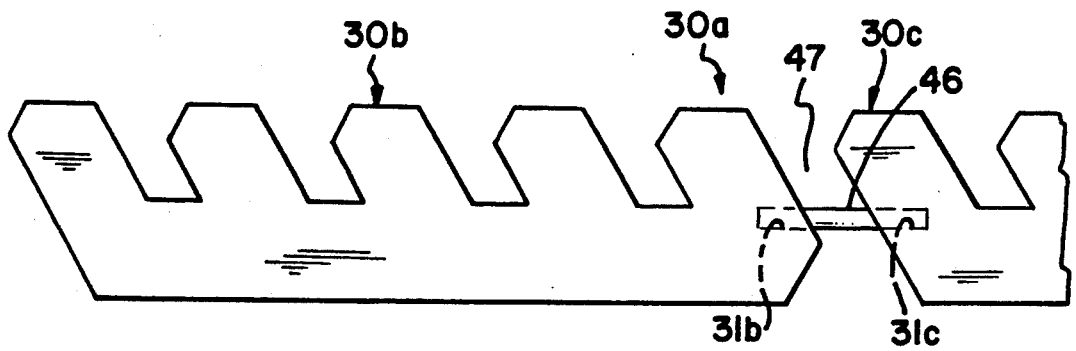
FIG. 5 is a top plan view of an alternate cleat plate of modular construction.
Figure 6:
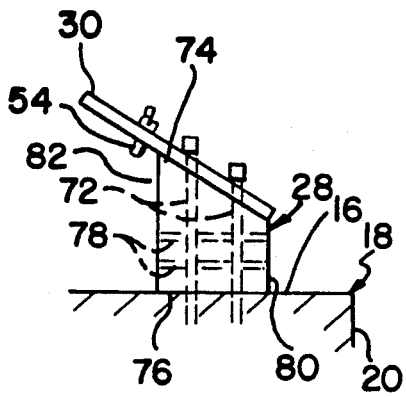
FIG. 6 is a side elevational view of the stern cleat shown in FIG. 1 and 2.

The required length of the cleat plate depends, in part, on the size of the boat. A longer and higher boat may require a longer cleat plate. FIG. 5 shows a modular cleat plate 30a which enables the length of the plate to be increased. In particular, cleat plate 30a includes modular plate sections 30b and 30c, each of which have apertures 31b and 31c in the respective ends. A dowel 46 extends into the apertures 31b and 31c to connect the cleat plates 30b and 30c. The space 47 between the cleat plates 30b and 30c is the equivalent of a slot for receiving a line from a boat. Thus a cleat plate effectively can be tailored to an appropriate size for each boat.

Figure 7:
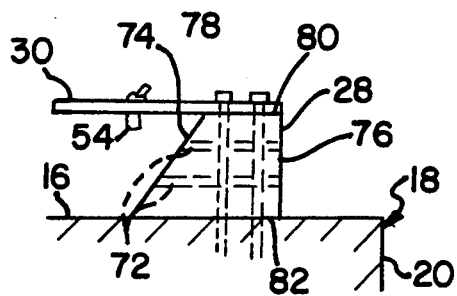
FIG. 7 is a side elevational view similar to FIG. 6 but showing the mounting block and cleat plate in a second orientation.
Figure 8:
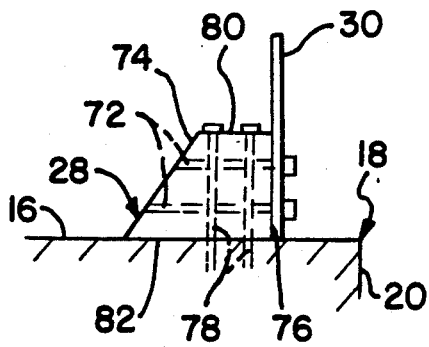
FIG. 8 is a side elevational view similar to FIGS. 6 and 7 but showing the mounting block and cleat plate in a third orientation.
Figure 9:
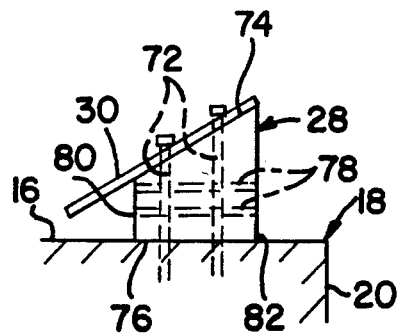
FIG. 9 is a side elevational view similar to FIGS. 6–8 but showing the mounting block and cleat plate in a fourth orientation.

The dock cleat plates 30-34 each are secured to the dock 18 by a pair of mounting blocks 28 as shown most clearly in FIGS. 6-9. The mounting blocks 28 are substantially trapezoidal in shape and include a pair of mounting apertures 72 extending between the opposed non-parallel faces 74 and 76 thereof and a second pair of mounting apertures 78 extending between the parallel faces 80 and 82. The mounting apertures 72 and 78 in each pair are spaced from one another by a distance to permit registration with the mounting aperture in the opposed ends of the cleat plates 30-34. The trapezoidal configuration of the mounting blocks 28 enables a plurality of different angular alignments of the dock cleat plates 30-34 mounted thereto. In particular, as shown most clearly in FIG. 6, the typical alignment will include each mounting block 70 mounted on the surface 76 such that the parallel surfaces 80 and 82 extend orthogonally from the top surface 16 of the dock 18. In this orientation, the surface 74 of the mounting block 70 will be pitched angularly upwardly and away from the side surface 20 of the dock 18. This angular alignment enables a line 22 to be securely retained in a slot of the associated cleat plate 30-34. Additionally, this alignment enables the line 22 to be snapped or whipped free of the cleat 10-14 by a person standing on the boat. Other optional alignments can be provided for particularly high or low docks and for boats that ride particularly high or low in the water. For example, FIG. 7 shows the dock cleat plate 30 aligned substantially vertically. FIG. 8 shows the dock cleat plate 30 aligned substantially horizontally and FIG. 9 shows the dock cleat plate 30 angularly aligned with the teeth facing downwardly.

Figure 10:
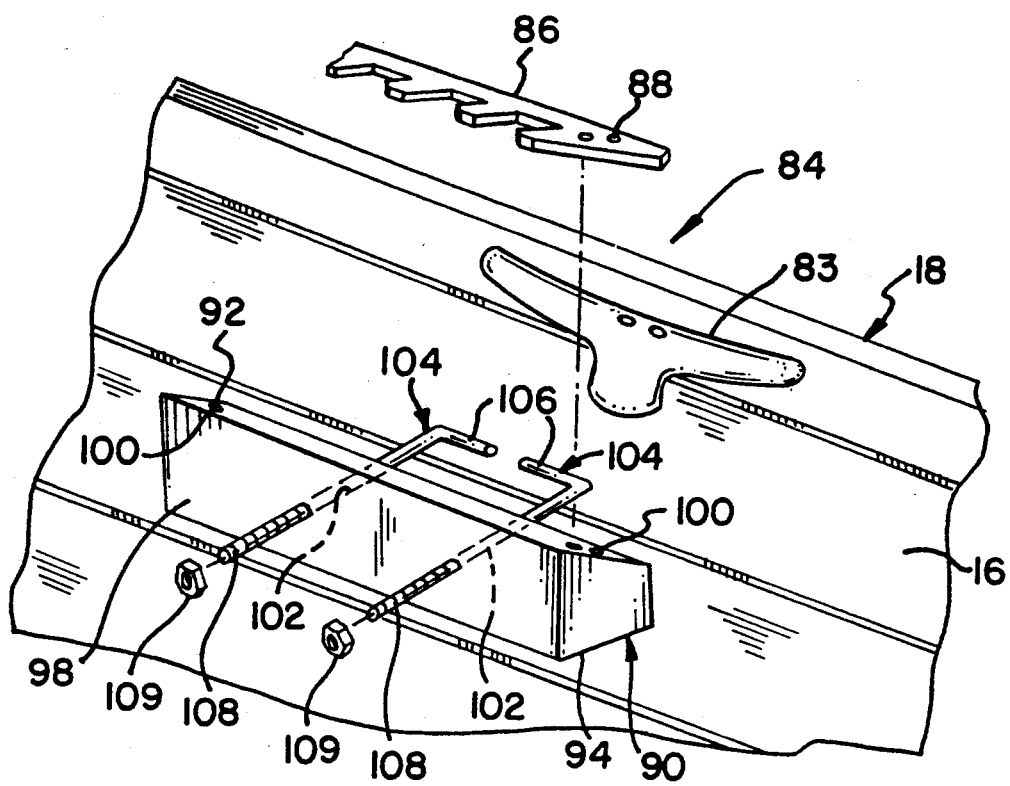
FIG. 10 is an exploded perspective view of a dock cleat for mounting to a prior art dock cleat.
Figure 11:
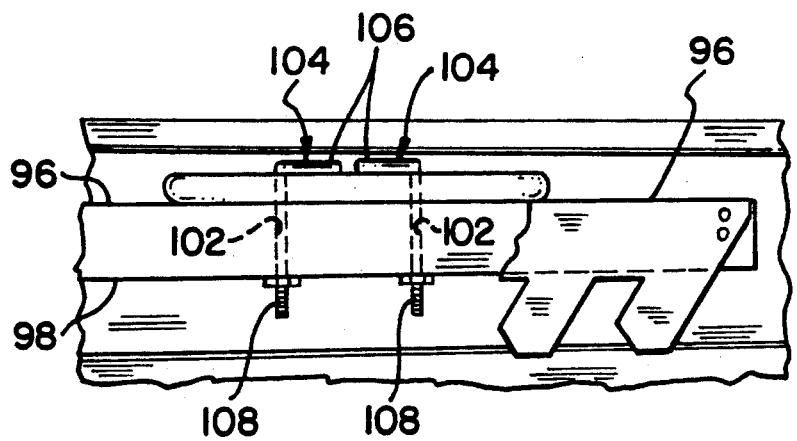
FIG. 11 is a top plan view, partly in section, of the dock cleat of FIG. 10 mounted to a prior art dock cleat.

As noted above, owners of many marinas prohibit renters from drilling holes into docks. For these situations, the subject invention incorporates a base that can be secured to the conventional prior art cleat without drilling into a dock. With reference to FIGS. 10 and 11, this embodiment of the dock cleat is identified generally by the numeral 84 and includes a cleat plate 86 substantially identical to the stern cleat 30 identified above. The cleat plate 86 includes mounting apertures 88 at opposed ends thereof. The dock cleat 84 further includes a mounting block 90 which may be of rectangular or trapezoidal cross-sectional shape. The mounting block 90 includes top surface 92, a bottom surface 94 and opposed front and rear surfaces 96 and 98 respectively. The mounting block 90 defines a length substantially corresponding to the length of the cleat plate 86. Mounting apertures 100 extend through the mounting block 90 from the top surface 92 for the bottom surface 94. The mounting apertures 100 are disposed to register with the mounting apertures 88 in the cleat plate 86. Mounting block 90 further includes apertures 102 extending entirely therethrough from the front face 96 to the rear face 98 thereof. The distance between the apertures 102 is greater than the width of the base of the prior art mounting cleat 83. The cleat 84 further includes a pair of L-shaped bolts 104 each of which has first and second legs 106 and 108 respectively. The leg 108 is threaded to receive a nut 109. The leg 108 also is dimensioned to fit between the top surface 16 of the dock 18 and the arms of the prior art cleat 83. The legs 106 are oriented to aim toward one another a sufficient distance to engage the base of the prior art dock cleat 83. With this embodiment, the mounting block 90 can be positioned adjacent the prior art cleat 83. The bolts 104 can be passed through the apertures 102, and the nuts 109 can be tightened, such that the base of the prior art cleat 83 is securely clamped between the mounting block 90 and the legs 106 of the L-shaped bolts 104. The cleat plate 86 can then be mounted to the mounting block 90 for use substantially as described above.

Figure 12:
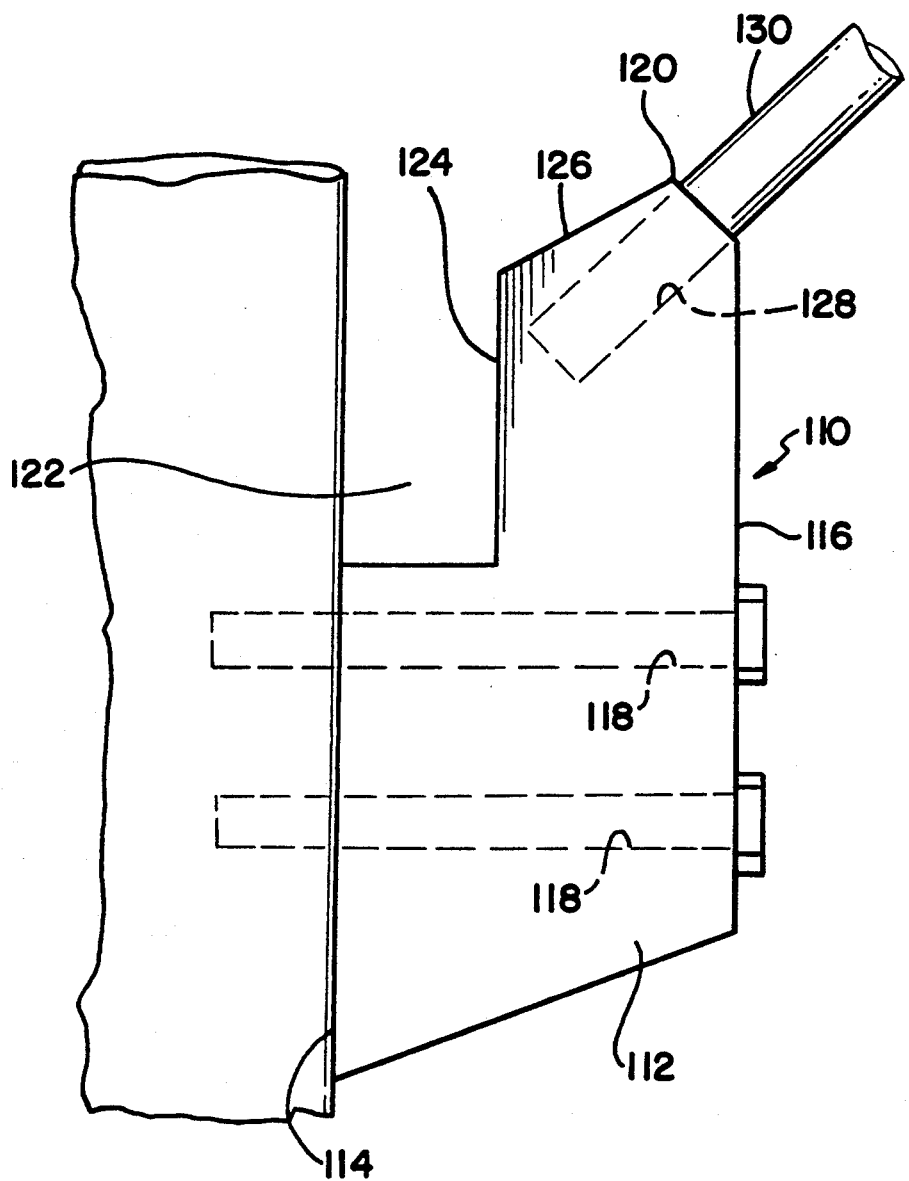
FIG. 12 is a side elevational view of a piling cleat in accordance with the subject invention.

Many boats must be secured at least partly to pilings. The piling may be free standing at a location spaced from the dock or may define a support of the dock as shown in FIGS. 1 and 2. For these situations, a piling cleat 110 is provided as shown in FIG. 12. The piling cleat 110 includes a generally planar cleat plate 112 with a mounting edge 114 and an opposed edge 116 extending generally parallel to the mounting edge 114. Mounting apertures 118 extend through the cleat plate 112 from edge 116 to mounting edge 114. The cleat plate 112 includes a top identified generally by the numeral 120. The portions of the top 120 generally on the mounting side of the mounting edge 114 of the cleat plate 114 define a retention notch 122. The retention notch 122 includes a retention edge 126 which extends generally parallel to the mounting edge 114. Thus, the retention edge 124 will be disposed in generally spaced parallel relationship to the piling 22 when the mounting edge 114 of the cleat plate 112 is mounted to the piling. The top 120 of the cleat plate 112 further includes a chamfered edge 126 which is angularly aligned to the retention edge 124 to facilitate the gravitational guiding of a line from a boat into the retention notch 122. Thus, the chamfered edge 126 functions similar to the chamfer on the teeth of the dock cleat plates 30-34 as described above. The top 120 of the cleat plate 112 further includes an aperture 128 extending diagonally therein. The guide dowel 130 is securely mounted in the aperture 128 and functions to further guide a line into the retention notch 124, as illustrated schematically in FIG. 12.

Figure 13:
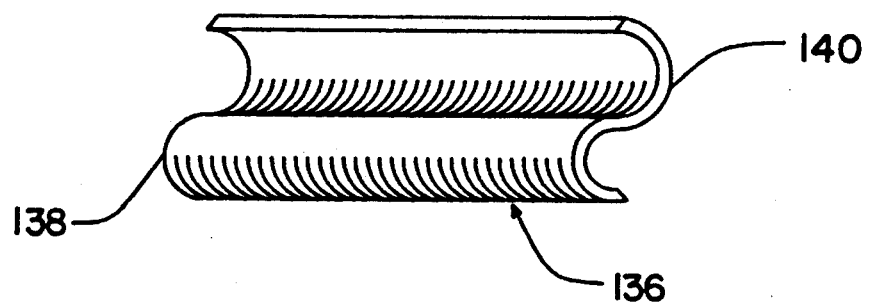
FIG. 13 is a top plan view of a frame for a knot in accordance with the subject invention.
Figure 14:
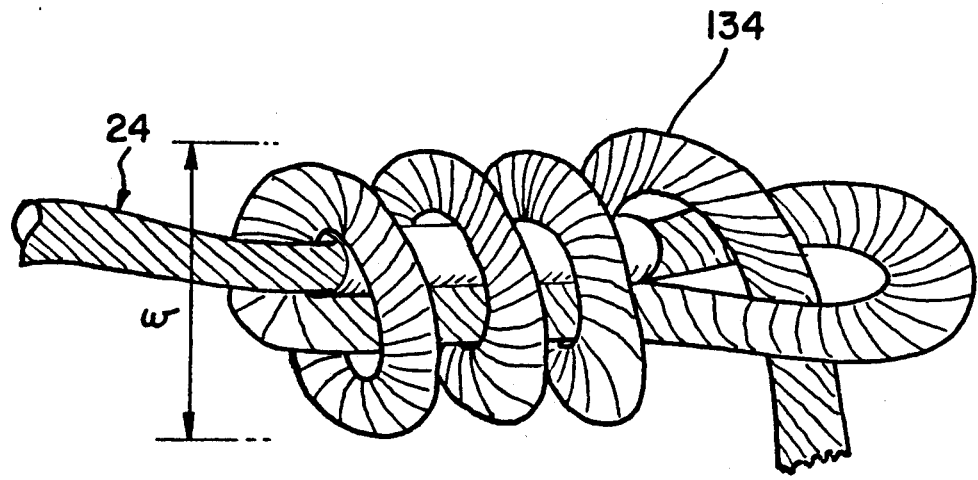
FIG. 14 is a side elevational view of a knot formed around the frame shown in FIG. 13.

With reference to FIGS. 13 and 14, the dock cleats or piling cleats described above may be used with a line 24 from a boat. The line 24 preferably is provided with a knot 134 defining a cross-section greater than the width of the associated retention slot of the dock cleat 10-14 or the piling cleat 110. The cross-section of the knot 134 may be controlled by a line frame 136, as shown most clearly in FIG. 13. The line frame 136 is formed form a generally S-shaped piece of corrugated metal having a length of approximately 4-6 inches. The corrugations 138 and 140 in the line frame 136 define diameters approximately equal to the diameter of the line 22. The frame may be used to facilitate tying of a monk's knot as shown in FIG. 14. The cross-sectional dimensions "w" of the knot 134 is carefully controlled by the line frame. The line frame 13b also adds to the weight of the line to facilitate accurate tossing toward the dock cleat. The knot may be dipped into a thermoplastic material to prevent unraveling and/or untying. The knot shown in FIG. 14 is more desireable than a ball in that it is less likely to bounce in response to impact with the dock. Additionally, the line frame is very inexpensive as compared to a specially manufactured ball for mounting to the worker end of the line.

In summary, dock cleats and piling cleats are provided to enable a boater to secure a boat and to cast off a boat without the assistance of a person on shore. The cleat includes a generally planar cleat plate having at least one retention slot formed therein. Preferably, a plurality of generally parallel retention slots are provided on cleats intended for mounting to a dock. Each slot includes a chamfered entry to facilitate the gravitational engagement of the line into the slot. The cleat plate may be secured to a generally trapezoidal mounting block which is oriented to achieve an optimum angle for alignment of the cleat plate. The mounting block may be secured directly to a dock or to a prior art cleat previously mounted to the dock. Slots in the cleat plate secured to the mounting blocks are aligned to open in a direction facing away from the boat to be docked. The alignment of the slots enhances the engagement of spring lines in the cleat plate.

While the invention has been described with respect to certain preferred embodiments, it is apparent that various changes can be made without departing from the scope of the invention as defined by the appended claims.

I claim:

1. A cleat for mounting to piling to enable selective engagement and disengagement of a boat line from a location spaced from the piling, the boat line having a working end with a cross-sectional dimension greater than cross-sectional dimensions of the boat line at locations spaced from the working end, said cleat comprising:

a planar cleat plate having opposed substantially parallel surfaces, an engagement edge and an opposed base edge extending between said surfaces, a notch defined along said engagement edge adjacent said piling and extending toward said base edge, said notch defining a cross-sectional dimension less than the cross-sectional dimension of the working end of the boat line and greater than the cross-sectional dimension of the boat line at locations spaced from the working end, a chamfer extending between said notch and said engagement edge of said cleat plate; and a plurality of mounting holes extending through said cleat plate generally parallel to the surfaces thereof and a plurality of bolts passing through the mounting holes and into the piling for mounting said cleat plate to said piling.

2. A cleat as in claim 1, further comprising a retention dowel projecting from said cleat plate in proximity to said chamfer, said retention dowel being aligned to guide the boat line into said chamber and into said engagement notch.

3. A cleat for mounting to a dock to enable selective engagement and disengagement of at least one boat line from a boat spaced from the dock, the boat line having a working end with a cross-sectional dimension greater than cross-sectional dimensions of the boat line at locations spaced from the working end, said cleat comprising:

a planar cleat plate having opposed first and second substantially parallel surfaces, opposed longitudinal ends and opposed longitudinally extending engagement and base edges extending between the ends and between the parallel surfaces, a plurality of notches defined along said engagement edge and extending toward said base edge each said notch defining a cross-sectional dimension less than the cross-sectional dimension of the working end of the boat line and greater than the cross-sectional dimension of the boat line at locations spaced from the working end, a chamfer extending between each said notch and said engagement edge of said cleat plate, mounting means for mounting said cleat plate to said dock such that said first surface of said cleat plate faces away from the boat, and an elongate elastic retention cord having opposed ends securely affixed respectively to the opposed ends of said cleat plate, portions of said elastic retention cord extending between said ends of said cleat plate being adjacent the first surface of the cleat plate, such that the elastic retention cord can be stretched over said working end after said boat line has been engaged in one said notch to retain said boat line in said notch.

4. A cleat for mounting to a dock having a horizontal top surface, to enable selective engagement and disengagement of at least one boat line from a boat spaced from the dock, the boat line having a working end with a cross-sectional dimension greater than cross-sectional dimensions of the boat line at locations spaced from the working end, said cleat comprising:

a planar cleat plate having opposed substantially parallel surfaces and opposed engagement and base edges extending between said surfaces, a plurality of notches defined along said engagement edge and extending toward said base edge, each said notch defining a cross-sectional dimension less than the cross-sectional dimension of the working end of the boat line and greater than the cross-sectional dimension of the boat line at locations spaced from the working end, a chamfer extending between each said notch and said engagement edge of said cleat plate and mounting means for mounting said cleat plate to said dock, the mounting means comprising a plurality of mounting blocks of substantially trapezoidal cross-section, each said mounting block having a plurality of angularly aligned dock mounting surfaces and having means for secure attachment of any of said dock mounting surfaces to the dock and having means for secure attachment of the cleat plate thereto such that the dock mounting surfaces of the respective mounting blocks enable optional angular alignments of said cleat plate to said horizontal top surface of said dock.

5. A cleat for mounting to a dock having a T-shaped line engaging structure mounted permanently thereto, the T-shaped line engaging structure including a support projecting away from said dock and a pair of oppositely directed arms extending from said support in spaced substantially parallel relationship to said dock, said cleat enabling selective engagement and disengagement of at least one boat lien from a boat spaced form the dock, the boat line having a working end with a cross-sectional dimension greater than cross-sectional dimensions of the boat line at locations spaced from the working end, said cleat comprising:

a planar cleat plate having opposed substantially parallel surfaces and opposed engagement and base edges extending between said surfaces, at least one notch defined along said engagement edge and extending toward said base edge, said notch defining a cross-sectional dimension less than the cross-sectional dimension of the working end of the boat line and greater than the cross-sectional dimension of the boat line at locations spaced from the working end, a chamber extending between said notch and said engagement edge of said cleat plate and mounting means for mounting said cleat plate to said T-shaped line engaging structure on the dock, the mounting means of said cleat comprising at least one bolt for releasable engagement of said cleat plate to said T-shaped line engaging structure permanently mounted on said dock.

6. A cleat as in claim 5, wherein the mounting means further comprises a mounting block having means for securely mounting the cleat plate thereto, the mounting block being dimensioned for engagement adjacent the support and the arms of the T-shaped line engaging structure permanently mounted to the dock and having volt holes disposed for alignment on opposed respective sides of the support of the T-shaped line engaging structure and between the arms thereof and the dock, the bolt having a first leg for threaded engagement in one said bolt hole of the mounting block, said first leg being dimensioned to extend from said mounting block and between the dock and the arms of the T-shaped line engaging structure, and a second leg angularly aligned to the first leg for clamping engagement with the T-shaped line engaging structure on the dock, 7. A cleat as in claim 6, wherein the at least one bolt comprises a pair of said bolts for engagement respectively in the holes of the mounting block.

8. A plurality of cleats for mounting to a dock and for selective engagement and release of a corresponding plurality of boat lines from locations spaced from the cleats, each said boat line having a working end with a cross-sectional dimension greater than cross-sectional dimensions of said boat line at locations spaced from said working end, said plurality of cleats comprising a stern cleat and a bow cleat, said stern cleat and said bow cleat each having an elongated generally planar cleat plate having a longitudinally extending base edge and an opposed edge defined by a plurality of slots extending therein, said slots being aligned at an acute angle to the base edge, each said slot defining a width less than the cross-sectional dimension of the working ends of the boat lines but greater than the cross-sectional dimensions of the boat lines at locations spaced from the working ends thereof, each said slot further comprising a chamfered entry for guiding one of said boat lines into said slot, said stern and bow cleats each further comprising at least one mounting block for mounting the respective cleat plate in spaced relationship to the dock.

9. A plurality of cleats as in claim 8, wherein the stern cleat is longer than the bow cleat.

10. A plurality of cleats as in claim 8, wherein the slots in said stern and bow cleats are angled in different respective directions such that the slots face generally away from the boat.

11. A plurality of cleats as in claim 10 further comprising a midship cleat, said midship cleat including a first plurality of slots aligned generally parallel to the slots in the stern cleat and a second plurality of slots aligned generally parallel to the slots in the bow cleat.

12. A cleat for selective engagement and release of a boat line from a location spaced from the cleat, the boat line having a working end with a cross-section greater than cross-sections of the boat line at locations spaced from the working end, said cleat comprising an elongate planar cleat plate having a longitudinally extending base edge and an opposed engagement edge defining a plurality of substantially parallel spaced apart teeth defining line engaging slots therebetween, said teeth and said slots being aligned at an acute angle to the base edge of said cleat plate, each said tooth including an elongate guiding edge, a retention edge parallel to said guiding edge and extending a shorter distance than said guiding edge and a chamfer edge extending angularly from said retention edge to define a chamfered entry into the respective slot, said cleat plate including a plurality of apertures extending therethrough, said cleat further comprising at least one mounting block having a plurality of apertures extending therethrough for registration with the mounting apertures of the cleat plate, a plurality of mounting bolts extending through the mounting apertures for securing the cleat plate to the mounting block, and means for securing the mounting block to a dock.

13. A cleat as in claim 12 further comprising an elastic cord fixedly attached to opposed ends of the cleat plate, said elastic cord being stretchable to selectively hold at least one said boat line in at least one of the slots of the cleat plate.

14. A cleat as in claim 12 wherein the mounting block is of non-rectangular polygonal cross-sectional shape to enable said cleat plate to be aligned at any of plural different angles relative to the dock.

15. A cleat as in claim 12, wherein the mounting bolts are dimensioned to pass entirely through both the cleat plate and the mounting block, and wherein the dock mounting means comprises threads on said mounting bolts engageable in the dock.

16. A cleat as in claim 12, wherein the dock includes a line engaging structure permanently mounted thereon, the mounting means of the cleat comprising means for securely clamping the mounting block to the line engaging structure permanently mounted on the dock.

17. A cleat as in claim 12, wherein the cleat plate comprises a plurality of coplanar cleat plate sections, each said cleat plate section having opposed longitudinal ends, each said end having a connecting aperture extending therein, said cleat further comprising at least one elongate rigid connection rod extending from the connecting aperture in one said cleat plate section to said connecting aperture in another of said cleat plate sections.

* * * * *